Patented Mar. 14, 1944

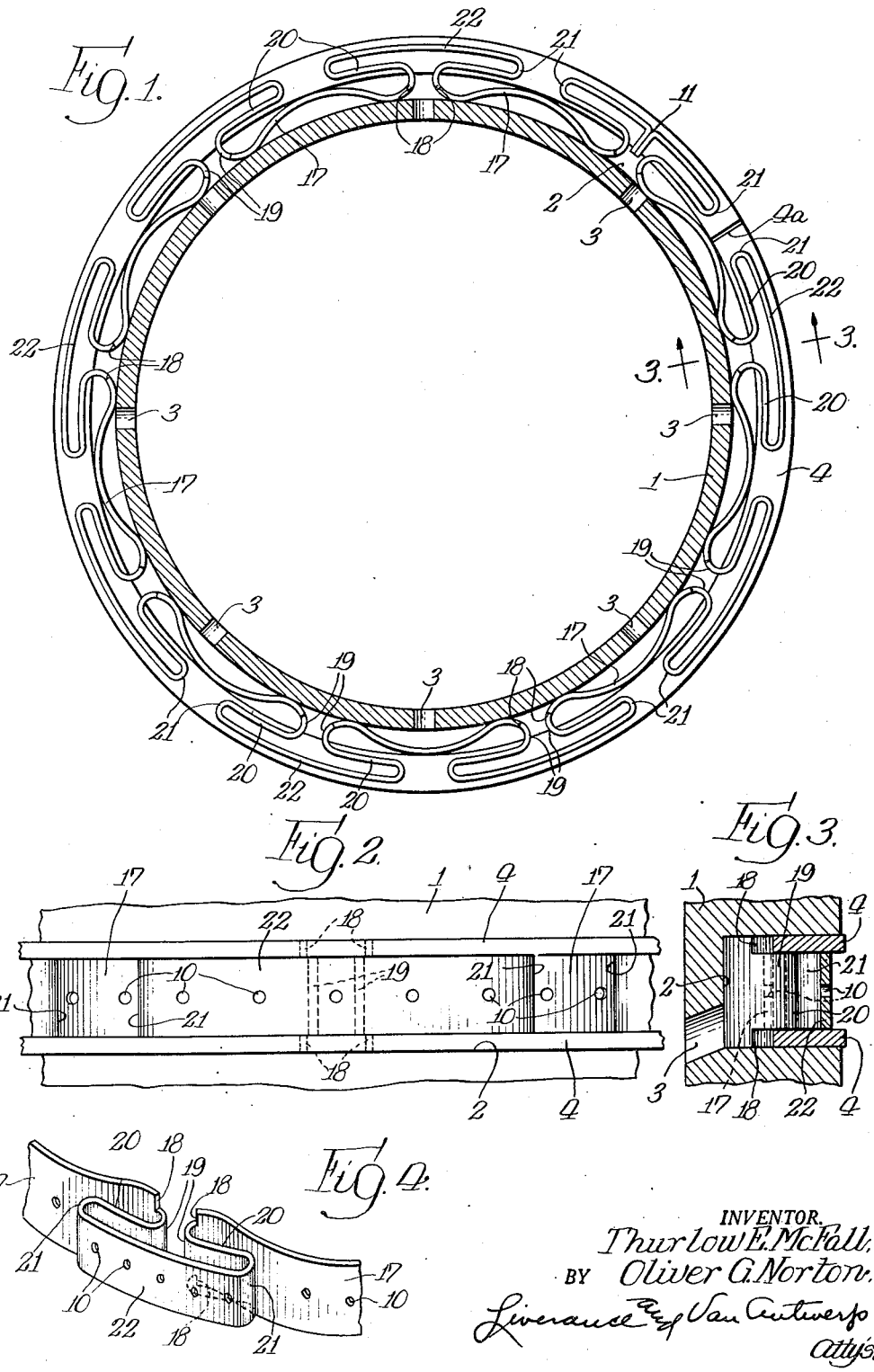

2,343,919

UNITED STATES PATENT OFFICE 2,343,919

PISTON RING STRUCTURE

Thurlow E. McFall, Sparta, and Oliver G. Norton, Detroit, Mich., assignors, by mesne assignments, to The Perfect Circle Company, Hagerstown, Ind., a corporation of Indiana Original application October 26, 1938, Serial No. 236,976. Divided and this application January 2, 1943, Serial No. 471,128

4 Claims. (Cl. 309—45)

This invention relates to piston rings, particularly useful in pistons of internal combustion engines.

With our invention a very novel and economical oil control piston ring is provided, which is capable of removing the excess oil from the cylinder walls in a very efficient fashion and in which those parts of the piston ring which bear against the cylinder walls are held thereagainst with a yielding spring pressure. Moreover, with our invention the contact of the oil scraping members of the ring with the cylinder walls is relatively small in area, thereby assuring a high unit wall pressure for a relatively moderate ring tension; thus promoting efficient oil scraping action without unduly increasing friction losses and cylinder wear. The ring which has been provided is particularly useful and practical.

This is a division of our application, Serial Number 236,976, filed by us on October 26, 1938.

An understanding of the invention may be had from the following description taken in connection with the accompanying drawing, in which:

Figure 1 is a transverse section through a piston at the innermost piston groove, the piston ring being shown in plan, with one of the narrow ring members removed.

Fig. 2 is a fragmentary elevation of the piston and ring of our invention.

Fig. 3 is a fragmentary section taken longitudinally of the piston and transversely of the ring, on the plane 3—3 of Fig. 1.

Fig. 4 is a perspective view of a fragmentary part of the spreading and spacing member of the ring.

Like reference characters refer to like parts in the different figures of the drawing.

The piston 1 is of conventional construction in which, adjacent to its end farthest away from the crank shaft a plurality of ring receiving grooves are cut around the piston in one or more of which grooves the ring of our invention is to be placed. The groove has passages 3 through the walls of the piston connecting the bottom of the ring groove with the interior of the piston, which is hollow.

The piston ring of our invention includes two thin lateral ring elements, which are adapted to engage the cylinder wall and which are usually of steel but which may optionally be constructed of any suitable material or materials which combine the desired characteristics of elasticity, structural strength and wear resistance, each being parted at one side thereof as at 4a (Fig. 1). These ring elements 4 are of substantially circular outline when compressed within the cylinder bore and are generally between twenty and forty thousandths of an inch in thickness, though it is to be understood that the design of the ring element 4 is not necessarily restricted to the specific construction or dimensions herein disclosed, but that either or both of them may optionally be composed of multiple juxtaposed circular segments or of any other suitable construction designed to more effectively limit the quantity of lubricating oil conveyed along the cylinder walls into the combustion chamber. When installed in a ring groove such as the groove 2, one of these ring members 4 lies against the upper side of the groove and the other at the lower side, whereby between the adjacent sides of the ring element 4 there is a considerable annular space.

The ring is completed by a spring ribbon member, which serves as a spreader (or expander) and spacer element. This element has inner bowed portions 17 which adjacent their ends bear against the bottom of the groove 2, the material then being narrowed and curved into return bends 19, one at each end of the inwardly bowed section 17, thence continued back in two straight sections 20 which approach each other and are then U-bent at 21, joining integrally with the outer connection section at 22. This provides a spacing and spreader member, which may also be termed a combined expander and spacer element, for the ring members 4, which are held apart by the elongated loops or outwardly bowed spacer reaches, which are of less axial width than the expander reaches 17, portions of the material being removed at both the upper and lower edge portions of the spacer reaches. Shoulders 18 are provided where the material of the spacer and spreader member is reduced in width as shown in Fig. 4, the height of the shoulders being substantially equal to the thickness of the ring elements 4. The ring members 4 bear against the central portions of the outwardly bowed expander sections or reaches 17 which are joined at each side by the inwardly bowed connecting reaches to the spacer reaches, the connecting reaches being adapted to engage the bottom of the piston groove in which the assembly is installed. The spacer reaches extend outwardly between the adjacent sides of the ring elements, spacing them apart and holding them in their positions in the ring groove.

The portions 17 and 22 may have openings 10 of suitable shape and cross sectional area pierced, slotted or notched for the passage of oil to the ring groove from whence it may pass inwardly through the openings at 3 to the interior of the piston. One of the portions 22 may be modified to provide a parting in the spring ribbon element as indicated at 11 or the ends of the spring strip may optionally be riveted, clipped, welded, brazed or otherwise suitably united to form a substantially continuous band if so desired.

The intermediate or expander spacer member of the ring assembly is made from thin flat ribbon steel stock preferably and may be of a thickness and form so as to provide the necessary pressure of the outer ring members 4 at their outer edges against the cylinder wall. The construction is not expensive to make, is readily assembled and installed in the ring groove, provides the necessary tension for the parts 4 of the ring which bear against the cylinder wall, and has ample passage for the oil which is collected by the ring and carried to the bottom of the ring groove.

While there has been shown the ring members 4 as thin flat ring members, it is to be understood that by the term ring member not only will a single member such as shown in Fig. 4 be comprehended, but that a composite structure consisting of two or more thin members or a plurality of them so long as they occupy the same position and serve the same purpose, is comprehended by the invention and the claims appended hereto.

We claim:

1. A piston ring construction comprising, two spaced apart rings, the combined thickness of which is less than the width of a ring groove in a piston in which the ring construction is to be installed, and a length of thin spring material formed to be received within an annular ring groove in a piston and having spaced outwardly bowed sections, the end portions of which are adapted to bear against the bottom of the ring groove, and then continued in reverse bends and in sections extending toward and approaching each other, each of said sections being reversely bent and integrally connecting with an outer section, thereby forming an elongated loop between each of the two consecutive bowed sections, the ends of said loop overlapping the adjacent portions of the bowed sections and shaped to lie between the inner and outer edges of the ring members, said loop having its edge portions each cut away a distance equal substantially to the thickness of a ring member, as and for the purpose specified.

2. A composite piston ring assembly comprising a pair of thin split expansible cylinder wall engaging elements of wear resisting material, a combined expander and spacer element formed of ribbon steel and having a plurality of spaced outwardly bowed expander reaches engageable with the inner edges of said cylinder wall engaging elements and having a plurality of outwardly bowed spacer reaches alternating with said first named reaches and of substantially greater radial height, said spacer reaches being of axial width equal to the spacing of said cylinder wall engaging elements to engage between said cylinder wall engaging elements and constitute spacers therefor, said spacer reaches being joined at each side thereof to said expander reaches by inwardly bowed reaches constituting thrust reaches for engagement with the bottom of a piston ring groove in which the assembly is installed.

3. A composite piston ring assembly comprising a pair of axially spaced cylinder wall engaging elements, and a combined spacer and expander spring member comprising a plurality of spaced outwardly bowed expander reaches engageable with the inner edges of said cylinder wall engaging elements, and a plurality of outwardly bowed spacer reaches alternating with said expander reaches and joined thereto at each side by inwardly bowed connecting reaches engageable with the bottom of a piston ring groove in which the assembly is installed, said spacer reaches extending outwardly between said cylinder wall engaging elements and being of axial width equal to the axial spacing of the cylinder wall engaging elements, so as to engage and constitute spacer elements for said cylinder wall engaging elements.

4. A combined spacer and expander spring element for a piston ring assembly, comprising a split spring member having a plurality of spaced outwardly bowed expander reaches, a plurality of spacer reaches outwardly bowed to a greater radial extent and being of lesser axial dimension than said expander reaches, said spacer reaches alternating with said expander reaches being joined thereto at each side by inwardly bowed connecting reaches of substantial length engageable with the bottom of a piston groove in which the assembly is installed.

THURLOW E. McFALL.
OLIVER G. NORTON.